July 11, 1944.  H. G. W. YOUNG  2,353,607
MACHINE FOR CUTTING EDIBLES
Filed Feb. 14, 1942  6 Sheets-Sheet 3

Fig. 3.

Inventor:
Henry G. W. Young,
by Walter E. Lombard
Atty.

Patented July 11, 1944

2,353,607

UNITED STATES PATENT OFFICE 2,353,607

MACHINE FOR CUTTING EDIBLES

Henry G. W. Young, Cambridge, Mass.

Application February 14, 1942, Serial No. 430,938

3 Claims. (Cl. 146—78)

This invention relates to machines for cutting edibles and is an improvement upon the device for cutting edibles, filed by applicant February 7, 1941, Serial No. 377,799.

One object of the invention is the provision of a machine of this character which is adapted to cut vegetables, fruits, meat and other foods into slices, cubes, strips, or into very small parts to be used in salads, soups or sandwiches.

One main object of the invention is to provide such a machine which may be used to cut a potato into slices for German fries and French fries.

A further object of the invention is the provision of means for cutting meat, cabbages, and other vegetables into very small parts for making salads and sandwiches and cole slaw in the case of cabbages.

A further object of the invention is to provide a removable plate on the forward ends of the side walls of the vertical compartment, this plate having a large opening therein through which an excessively large potato may be inserted into the compartment or through which a large variety of other edibles may be inserted into said compartment to be divided in small pieces to form a salad.

Another object of the invention is the construction of the cam slots of the cam plates in such a manner that when the vertically movable plunger is doing its heaviest work the force imparted to the projections on the vertically movable plunger will be in a direct line.

A still further object of the invention is the production of a machine of this character which may be constructed at a minimum cost and which will be lighter and at the same time much stronger than machines of this character now in use.

The objects of the invention are attained by the instrumentalities shown in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 5 represents a transverse vertical section on line 5, 5 on Fig. 1.

Similar characters indicate like parts throughout the several figures of the drawings.

In the drawings, 10 is a portion of a table or bench for supporting the machine.

On this table or bench may be disposed a base 10x to the upper face of which is secured a metal base plate 11 which is of equal thickness throughout and is secured to the base 10x by headed screws 11x.

To the top of this base plate 11 is spot welded the inwardly extending flanges 12 of a pair of pressed steel members having upwardly extending side plates 13 formed integral with said flanges 12.

Each of the side plates 13 has at 14 a vertical U-shaped depression in the upper end of which is disposed an inverted U-shaped strengthening member 15 having outwardly extending flanges 15x resting on the tops of the plates 13.

Extending through the reinforced portions 14, 15 of these side plates 13 and through bearings 13x formed in the upper ends of the depressions 14 is an oscillating shaft 16 having mounted thereon and secured thereto between said side plates 13 the hub 17 of a manually actuated lever 18.

Each outer end of the shaft 16 has secured thereto the hub 17x of a plate 19 having a cam slot 20 in its forward end and a threaded pin 21 at its outer rear portion, said pin 21 having a reduced cylindrical end 22 extending through the front end of a link 23, the rear end of which has a hub 24 through which extends a shaft 25.

The shaft 25 extends through a horizontal movable plunger 26 and the opposite ends of this shaft 25 extend through horizontal slots 27 formed in the plates 13.

At the forward end of the horizontal slots 27 the plates 13 have secured thereto reinforcing plates 27x having concaved walls therein against which the shaft 25 will abut at the end of its forward movement.

These reinforcing plates 27x will prevent the forward ends of the slots 27 being pounded out of shape by the shaft 25 in its forward movement when the machine is operated.

Figure 13:
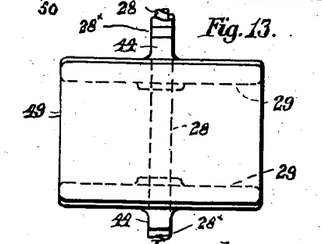
Figure 13 represents an inverted plan of a vertically movable plunger having a plane lower face.
Figure 16:
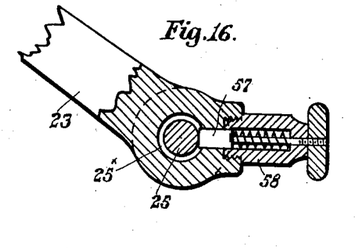
Figure 16 represents a sectional detail showing the means for locking the shaft of the horizontally movable plunger to its actuating link.

Extending through the cam slots 20 is a shaft or pin 28, said shaft extending through upwardly projecting ears 29 of a plunger 30, the under face of which preferably has a plurality of parallel grooves 31 formed therein but in some cases these grooves 31 may be omitted, as shown in Fig. 13.

Figures 1, 7, 8:
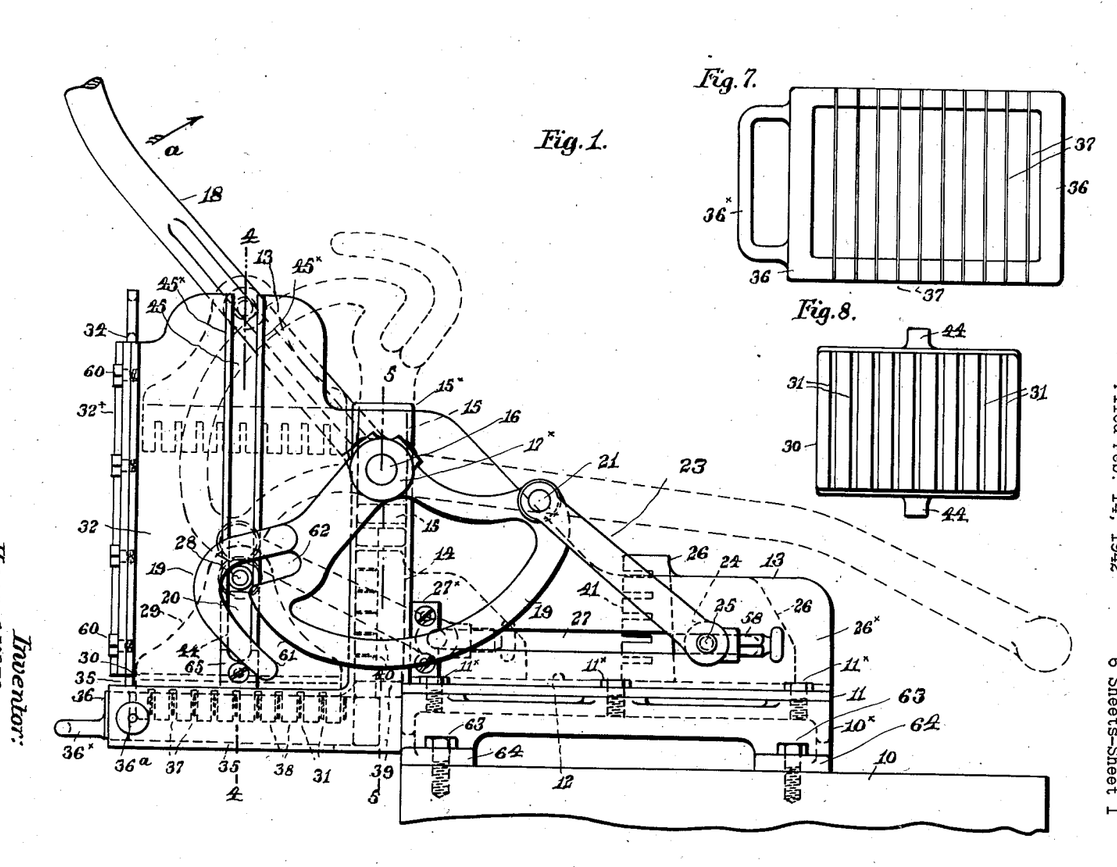
Figure 1 represents the side elevation of a machine embodying the principles of the present invention.
Figure 7 represents a plan view of the knife frame shown at the bottom of Fig. 1 of the drawings.
Figure 8 represents an inverted plan of the plunger adapted to cooperate with the knives shown in Fig 7.

It is obvious that by moving the handle 18 in the direction of the arrow a on Fig. 1 of the drawings, the plunger 30 will be raised in the bottomless chamber 32 and then after a slight interval of time the plunger 26 will be moved horizontally toward said chamber 32 in the trough 26x provided therefor at the rear end of the machine.

This trough 26x communicates at its forward end with the vertical chamber 32 as shown in the drawings.

The forward ends of the plates 13 forming the side walls of the chamber 32 are spaced apart and entirely disconnected from each other.

To these forward ends of the side plates 13 is secured a front plate 32x which has a very large opening 33 therein normally closed by a plate 34 movable vertically in a depression in the rear face of said plate 32x.

The rear wall of this slidable plate 34 forms the front inner wall of the chamber 32 when said plate 34 is in its lowest position.

This chamber 32 is in front of the front edge of the table or bench 10 and is open at the bottom.

Beneath the chamber 32 are two oppositely disposed grooves 35 formed in the lower portions of the plates 13, these grooves extending rearwardly and having their upper and lower walls parallel.

In the grooves 35 is adapted to be disposed a single removable frame 36 having extending transversely thereof a plurality of knives 37 between which the parallel projections 38 formed by the grooves 31 of plunger 30 are adapted to be disposed when the plunger 30 is in its lowest position.

In the rear wall of the chamber 32 is adapted to be disposed in the lower ends of the depressions 14 a removable frame 39 having a plurality of knives 40 transversely disposed therein, these knives 40 being perpendicular to the knives 37 in the frame 36.

At the rear of the frame 39 is the plunger 26 having formed in its front face a plurality of parallel projections 41, the front ends of which are flat and in the same plane.

When the plunger 26 is moved forwardly toward the chamber 32 the projections 41 will enter the spaces between the knives 40 of the frame 39.

In the operation of the machine a potato P may be placed between the side walls 13 and in front of the plunger 26.

When this has been done the operator moves the handle 18 in the direction of the arrow a and causes the plunger 30 to be raised in the chamber 32 and when the plunger has reached a predetermined height the plunger 26 will be moved forward to force the potato into the chamber 32 passing between the knives 40 and thereby causing the potato to be divided into slabs.

These divided slabs of potato are forced by the plunger 26 under the plunger 30 and when the plunger 30 is moved downwardly by the movement of the handle 18 in the opposite direction to the arrow a, the slabs of potato will be divided again into a plurality of strips of potato suitable for French fries, which strips may be dropped from the knives 37 into any suitable receptacle beneath the open lower end of the chamber 32.

The knives 37 have their cutting edges all in the same plane so that material emitted from the trough 26x will be supported on said knives 37 until forced between said knives at the end of the downward movement of said plunger 30.

The knife frame 36 is provided with a handle 36x by which said frame may be freely inserted into or removed from the grooves 35.

Figures 9, 10, 11, 12, 14, 15, 17:
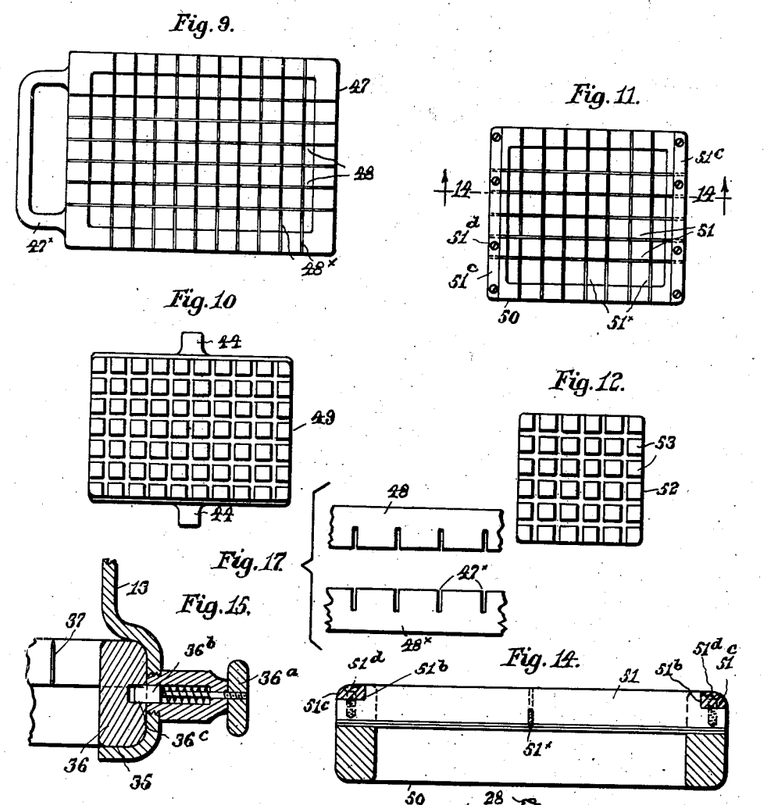
Figure 9 represents a different form of knife frame in which two sets of knives are used perpendicular to each other.
Figure 10 represents an inverted plan of the plunger used in connection with the knives shown in Fig. 9.
Figure 11 represents a knife frame adapted to be vertically disposed in the machine to cooperate with a horizontally movable plunger.
Figure 12 represents a front elevation of the plunger adapted to cooperate with the knives of Fig. 11.
Figure 14 represents a section of one of the knife frames showing means for locking said knives to said frame.
Figure 15 represents a sectional detail showing the means for locking the horizontally disposed knife frame in working position.
Figure 17 represents portions of two of the knives used in the frame shown in the knife frames of Figs. 9 and 11 and showing how the knives may be interlocked.

When thus inserted into the grooves 35 it is locked in working position by means of the spring pressed bolt 36a having a reduced inner end 36b inserted into a cylindrical depression 36c in one side of the frame 36, as shown in Fig. 15.

The frame 39 may be inserted into the depressions 14 from the lower ends thereof until its upper end comes into contact with the lower end of the U-shaped member 15.

It is then in working position and is locked in this position by means of one or more screws 43, as shown in Fig. 5.

The outer ends of the shaft 28 extend through the ears 29 of the plunger 30 and these outer ends and the elongated projections 44 on the sides of the ears 29 of the plunger 30 are adapted to travel in vertical slots 45 formed in the side plates 13, said slots having outwardly extending flanges 45x on either side thereof, these flanges 45x stiffening the plates 13 and forming better bearing surfaces for the rollers 28x mounted on reduced cylindrical ends of said shaft and the elongated projections 44.

When it is desired to slice other vegetables, fruits and meat for use in salads, for pickling, or making sandwiches, the frame 36 may be removed from the grooves 35 and another frame 47 substituted therefor, as shown in Fig. 9.

This frame 47 has a plurality of knives 48 extending lengthwise thereof and spaced apart by transversely disposed knives 48x as shown in Fig. 9 of the drawings. Any desired number of knives may be used in the two sets of knives.

The spacing apart of the two sets of knives 48 and 48x may be varied to suit different conditions of work to be done.

The frame 47 preferably has a handle 47x by which it may be inserted freely into the grooves 35 and removed therefrom.

When this frame 47 with its knives 48, 48x is to be used a plunger 49 may be substituted for the plunger 30 in the chamber 32, the under side of the plunger 49 having a plain unbroken surface as shown in Fig. 13 of the drawings.

When the plunger 49 is in its upper position the slidable plate 34 is removed and then various edibles may be inserted into the chamber 32 through the opening 33, these edibles being disposed upon the knives 48 and 48x.

The knives 48x are provided in the upper end thereof with a plurality of slits 47x as shown in Fig. 17 of the drawings, and the knives 48 are disposed in these slits 47x.

By this construction the knives 48 are prevented from buckling and consequently are retained in parallelism at all times.

The slits 47x may be spaced apart at different distances according to the different work to be performed.

The slidable member 34 is then moved into position to close the opening 33.

Figure 6:
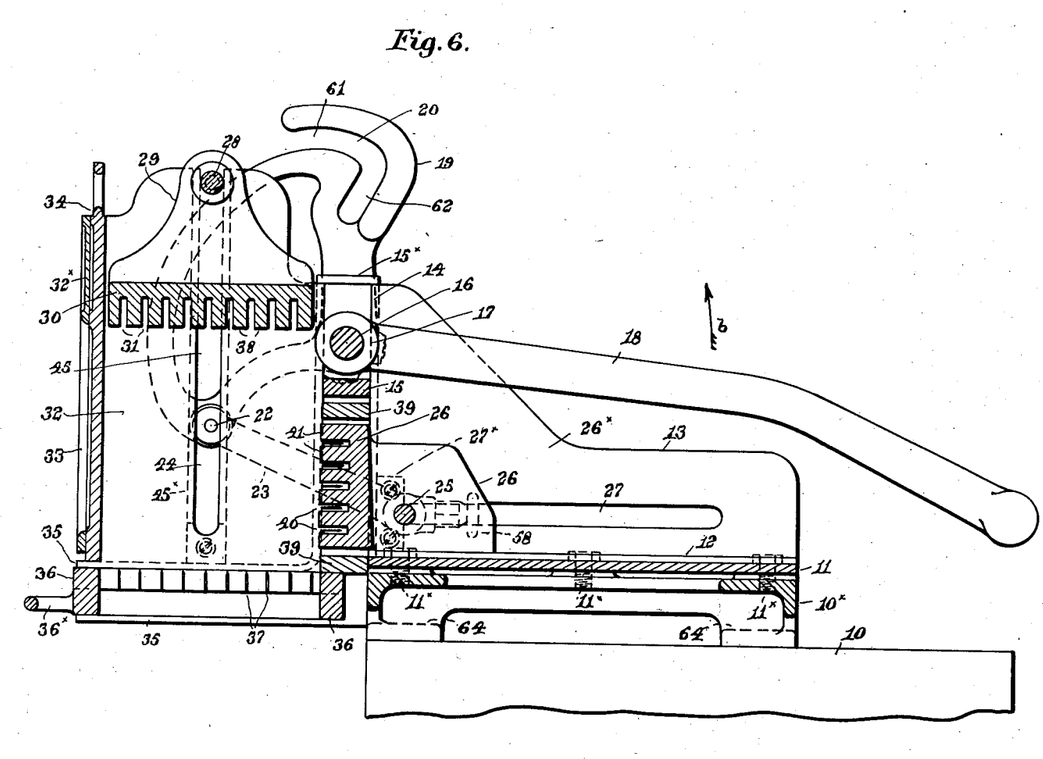
Figure 6 represents a longitudinal vertical section of the same in which the horizontally movable plunger is omitted, and showing an operating handle to actuate a vertically movable plunger in a vertical compartment, said plunger coacting with knives positioned in the bottom of said compartment.

The operator then by moving the handle 18 in the direction of the arrow b on Fig. 6 of the drawings, will lower the plunger 39 and force the edibles in chamber 32 downwardly through the spaces between the knives 48 and 48x allowing the divided portions thereof to drop into any suitable receptacle to receive them.

The various edibles thus cut into small pieces are in condition to be used at once for salads.

When it is desired to cut edibles into strips or rectangular pieces, the frame 39 is removed from the vertical grooves 14, and a frame 50 is inserted into said grooves 14, this frame 50 having two sets of knives 51, 51x, spaced apart with one set of knives perpendicular to the other set, as shown in Fig. 11 of the drawings.

When this frame 50 is in use a plunger 52 is used instead of the plunger 26, said plunger 52 having rectangular flat-ended projections 53 formed in the front face thereof.

When the frame 50 and plunger 52 are in use there is no plunger required in the chamber 32.

The potato or other edibles having been placed by the operator between the plunger 52 and frame 50, the lever 18 may be moved in the direction of the arrow a on Fig. 1 of the drawings and the edibles will be forced through the openings between the knives 51 causing the same to be cut into elongated sections rectangular in cross section.

These sections thus cut may be dropped through the open bottom of the chamber 32 into any suitable receptacle provided to receive the same.

One end of the shaft 25 has an annular peripheral groove 25x formed therein and normally positioned in this groove is a reduced end 57 of a spring pressed bolt 58, thus preventing any accidental end movement of the shaft 25. The groove 25x has parallel flat-sided walls radiating from a cylindrical bottom surface.

When it is desired to remove the plunger 26 and substitute therefor another plunger such as 52, the reduced end 57 of the bolt 58 is removed from the peripheral groove 25x, thus permitting the shaft 25 to be moved endwise and removed from the plunger 26.

When a new plunger such as 52 is substituted for the plunger 26, the shaft is positioned therein and then locked from end movement by means of the bolt 58.

Outwardly extending flanges 59 at the front end of the side members 13 not only stiffen the same but also provide a means whereby the front plate 32x of the machine may be secured thereto by the screws 60.

Figure 2:
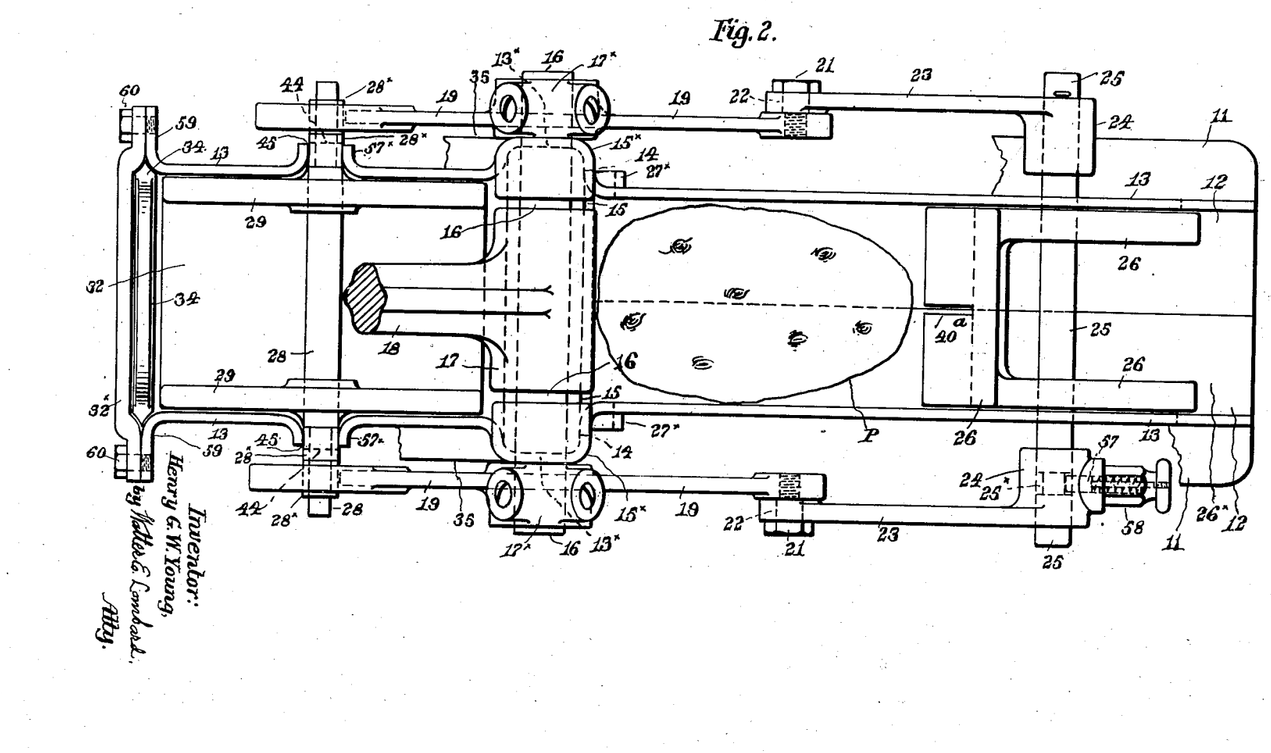
Figure 2 represents a plan of the same.
Figure 3:
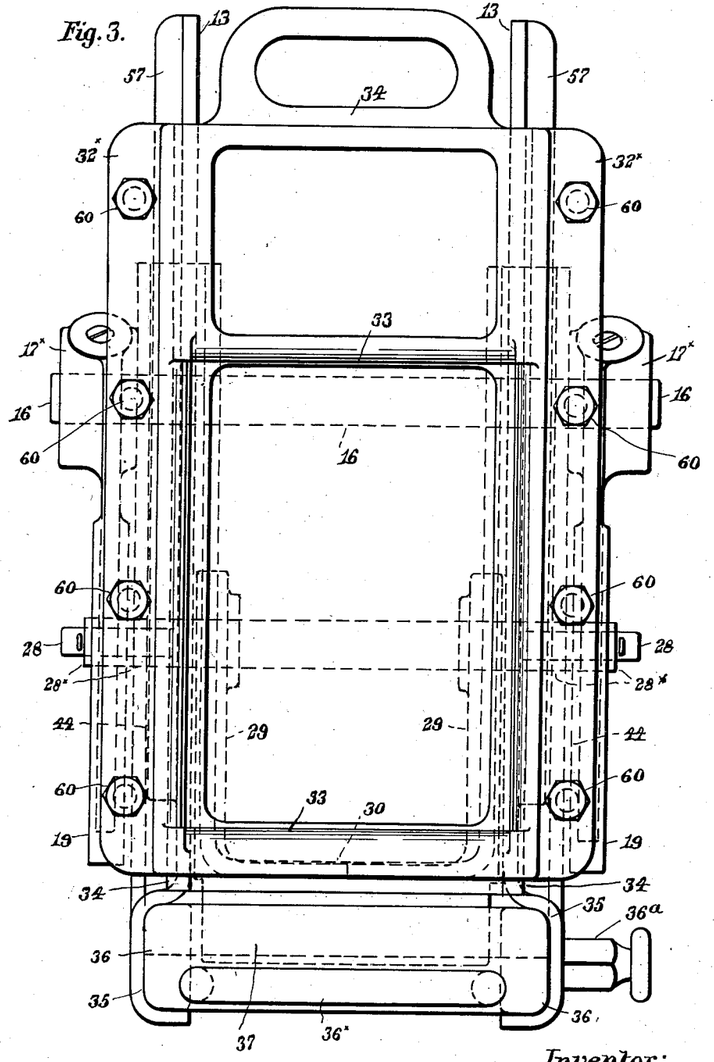
Figure 3 represents a front elevation of the same drawn to an enlarged scale and showing one form of knife frame at the bottom thereof.

The making of the framework in the manner shown and described is of considerable importance as the base plate 11 is preferably made of steel of equal thickness throughout and the inwardly extending flanges 12 of the side members 13 are spot welded or otherwise secured thereto, the adjacent edges of the flanges 12 preferably abutting as shown at the right of Fig. 2.

These side frames 13 with their inwardly extending flanges 12 are made of polished pressed steel of equal thickness throughout and are provided with the longitudinal slots 27, the vertical U-shaped depressions 14, the cylindrical holes 13x near the top of the depressions 14, the flanges 45x forming broad faced walls for the vertical slots 45, and has the outwardly extending reinforcing flanges 59 at the forward ends of said side plates 13.

By this construction a very rigid framework is secured which is much lighter than a framework formed of cast metal.

Moreover, by forming the framework in the manner shown and described, the cost of manufacture is greatly reduced and a stronger unbreakable framework is provided.

It has been found that by manufacturing the framework in the manner described, the entire machine may be built for less than one-half the cost of manufacturing one which is composed of cast metal and in which various parts thereof require much machining.

It is quite obvious that by making the trough 26x of cast metal a great amount of difficult machining must be done in order to provide a smooth surface on which the horizontally movable plunger 26 may slide.

In the present case owing to the fact the upper faces of the inwardly extending flanges are of polished steel, the plunger 26 will slide freely thereon and no machining of this part of the framework will be required.

When the frame 50 is positioned in the depressions 14 the rear ends of the knives 51 mounted therein will be in alinement with the rear wall of the chamber 32, thus practically providing a continuation of said rear wall.

Figure 4:
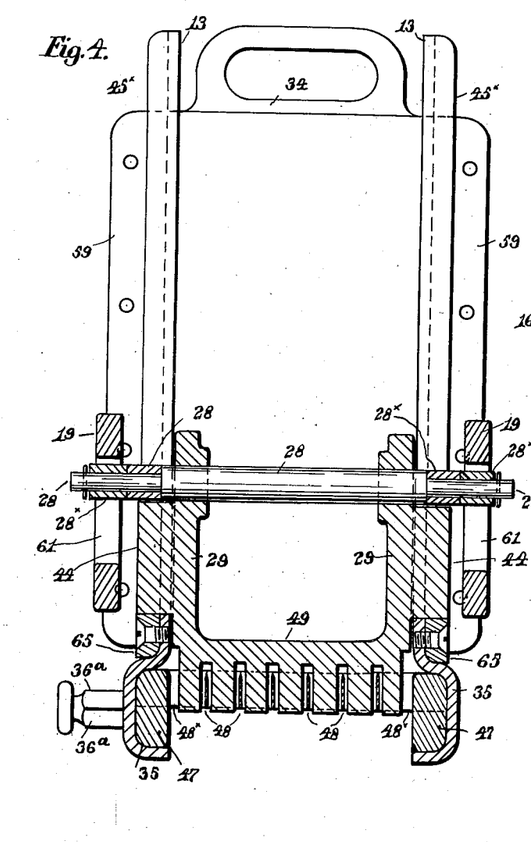
Figure 4 represents a transverse vertical section of the same on line 4, 4 on Fig. 1, and showing another form of knife frame positioned in the bottom thereof.

In the same manner, when a knife frame 47 is disposed in the horizontal grooves 35 as shown in Fig. 4, this frame having two sets of knives therein, the knives of one set being perpendicular to those of the other set and with their upper cutting edges all in the same plane, a surface is provided on which may be discharged the material emitted from the trough 26x by the forward movement of the horizontally movable plunger 26.

From the description hereinbefore given, it is quite apparent that this machine as shown and described may be utilized for cutting various edibles into different shapes according to the manner in which they are to be cooked or served.

All that is necessary in order to accomplish this is to provide different frames having knives arranged therein in such a manner as to accomplish the purpose desired, these knives coacting with suitable coacting plungers, it being understood however that in some cases only a single horizontal plunger 52 is required without any plunger in the chamber 32, and in other cases no horizontally movable plunger is required and the plunger 49 as shown in Fig. 10 is provided which in its downward movement will cooperate with the knives 48 and 48x and accomplish the desired object.

It is obvious that knives may be provided to be used in the machine to form corrugated edibles and to coact with special forms of plungers which will coact with said corrugated knives, all as shown and described in the application of applicant previously referred to.

The formation of the cam slots 20 in each of the cam plates 19 as shown in the drawings is of considerable importance, as it is constructed with a lower arcuate portion 61 from the upper end of which is a straight portion 62 in a line extending considerably beneath the axis of the shaft 16.

By constructing the cam slots 20 in this manner the point on the cam slot 20 doing the downward push upon the shaft 28 when the plunger 30 is doing its heaviest work will travel in almost a direct vertical line, and therefore superior results may be obtained by the construction of the cam slots shown over the cam slots heretofore used in similar machines.

It will be noted that the connections 21 at the forward end of the links 23 whereby said links are pivotally connected to outer portions of the cam plates 19 at a point in the rear and substantially the same level as the axis of the shaft 16 are so high that when the handle 18 is moved in the direction of the arrow a no forward movement of the plunger 26 can be imparted thereto until the plunger 30 is above the upper end of the knife frame 39.

This means of providing lost motion to the plunger 26 at the initial movement of the handle 18 in the direction of the arrow a is of considerable importance, for obviously it would not be possible to push the potato between the knives 40 while the plunger 30 was in a position opposite these knives 40 and forming an obstruction for the movement of the slabs of material being ejected from the openings between the knives 40.

It has been found in practice that when a greatly elongated handle 18 is used as in the present case, and the base plate 11 is mounted on the bench 10 as in application Ser. No. 377,799, there is at the end of the movement of the handle 18 quite a strain upon the wrist.

It has been found that this objection is wholly overcome by raising the base plate 11 to a higher level above the bench 10 and supporting it on a solid base 10x.

Considerable rigidity is provided for the machine by securing this solid base 10x to the bench 10 by means of bolts 63 extending through ears 64 on said base 10x.

As shown in Fig. 14 of the drawings the upper knife 51 has in its bottom edge a slot 51a in which the knife 51x is disposed and at its opposite ends it is cut away as shown at 51b.

Inserted into each cut away portion 51b is a strip 51c which is secured to the frame 50 by means of screws 51d.

By this means all of the knives are firmly held in position on the frame 50 and cannot be dislodged from the frame when said frame is in its working position by any material forced against said knives by the forward movement of the plunger 52.

For convenience only one knife 51x is shown in Fig. 14 but in practice it is to be understood there would be a plurality of such knives.

At the bottom of the vertical slot 45 there is secured to the side frames 13 a reinforcing plate 65 (see Figs. 1 and 4) having a concaved portion at its upper end adapted to coact with the elongated projection 44 and prevent the lower end of the slot 45 being damaged by the downward movement of the plungers in the compartment 32 during the operation of the machine.

In doing some classes of work it is preferable to have the transverse knives 40 of the knife frame 39 provided with only one centrally disposed vertical knife similar to 40x, shown in Fig. 5 of the drawings, said knife 40x preventing any buckling of the knives 40.

When such a knife frame is used the horizontally movable plunger 26 is provided with a central slot 40a, as shown in Fig. 2 of the drawings.

This slot 40a receives the vertical knife 40x at the end of the forward movement of said plunger 26.

It is self-evident that this unitary machine may be utilized in cutting up meats, fruits and vegetables in many different ways, thus obviating the necessity of providing a plurality of machines to do the different classes of work.

This is of considerable importance as it reduces the cost of providing many machines to do the different kinds of work, all of which may be accomplished in the machine herein shown and described.

Moreover, it is of great advantage to perform all the different classes of work in one machine as it will occupy so much less space than a plurality of machines would occupy to do the same work.

For instance, the meat may be diced in the compartment 32 by utilizing the plunger 49 to force said meat downwardly through or part way through the spaces between the knives 48, 48x, this operation being wholly accomplished by means of the plunger 49 without utilizing the horizontal plunger 26.

In the same manner a plurality of vegetables or fruits may be placed in the compartment 32 and by means of the downward movement of the plunger 30 they may be cut up into small pieces suitable to form a salad.

By placing vegetables in the trough 26x and utilizing the horizontally movable plunger 26 these vegetables may be cut into slabs, and if desired these slabs may be further operated upon by means of the knives 37 at the bottom of the compartment 32 when the plunger 30 is moved downwardly into its lowest position, thus cutting the slabs into strips.

As a matter of fact, by varying the knife frames in the horizontal grooves 35 and in the vertical grooves 14, any kind of meat, vegetable or fruit may be cut into any desired shape.

It should be understood, however, that the compartment 32 with the vertical movable plunger therein and the knife frames in the bottom of the said compartment is utilized to accomplish the majority of the work for which the machine is designed and incidentally to accomplish other kinds of work the horizontally movable plunger 26 may be brought into commission.

It is believed that the operation and many advantages of the invention will be understood without further description.

Having thus described my invention, I claim:

1. In a machine for cutting edibles, the combination of a frame provided with a horizontal trough having vertical side walls and a vertical compartment at the forward end of said trough and communicating therewith; a series of knives in horizontal guideways in said side walls and at the bottom of said compartment and adapted to be displaced by horizontal movement thereof; a vertically movable plunger coacting with said knives; a second series of knives disposed in vertical guideways in said side walls at the forward end of said trough and adapted to be displaced by downward movement thereof; a horizontally movable plunger in said trough and coacting with said second series of knives; an oscillating shaft extending transversely of the trough and through the side walls of said frame; and means outside of said side walls secured to and actuated by said oscillating shaft for imparting reciprocatory movement to both of said plungers, said last means including cam plates secured to the outer ends of said oscillating shaft and oscillating therewith, said plates having substantially V-shaped cam slots therein; links connecting the outer rear portions of said cam plates to said horizontally movable plunger; projections on the vertically movable plunger extending through vertical slots in the side walls of said frame and into said cam slots; and two rollers on each projection of which the inner rollers are rotatable in one direction in the vertical slots and the outer rollers are positioned in the cam slots and rotatable in the opposite direction.

2. In a machine for cutting edibles, the combination of a frame provided with a horizontal trough having vertical side walls and a vertical compartment at the forward end of asid trough and communicating therewith; a series of knives in horizontal guideways in said side walls and at the bottom of said compartment and adapted to be displaced by horizontal movement thereof; a vertically movable plunger coacting with said knives; a second series of knives disposed in vertical guideways in said side walls at the forward end of said trough and adapted to be displaced by downward movement thereof; a horizontally movable plunger in said trough and coacting with said second series of knives; an oscillating shaft extending transversely of the trough and through the side walls of said frame; and means outside of said side walls secured to and actuated by said oscillating shaft for imparting reciprocatory movement to both said plungers, said last means including cam plates secured to said oscillating shaft; a removable shaft extending transversely through an elongated cylindrical bearing in the horizontally movable plunger; links connecting the opposite ends of said plunger shaft with outer portions of the cam plates; and a locking bolt in an end of one of said links extending into an annular groove in said plunger shaft, said groove having parallel flat sides.

3. In a machine for cutting edibles, the combination of a frame provided with a horizontal trough having vertical side walls and a vertical compartment at the forward end of said trough and communicating therewith; a series of knives in horizontal guideways in said side walls and at the bottom of said compartment and adapted to be displaced by horizontal movement thereof; a vertically movable plunger coacting with said knives; a second series of knives disposed in vertical guideways in said side walls at the forward end of said trough and adapted to be displaced by downward movement thereof; a horizontally movable plunger in said trough and coacting with said second series of knives; an oscillating shaft extending transversely of the trough and through the side walls of said frame; and means outside of said side walls secured to and actuated by said oscillating shaft for imparting reciprocatory movement to both of said plungers; said last means including cam plates secured to said oscillating shaft and provided with substantially V-shaped cam slots of which the outer portions are arcuate and the inner portions are straight and in a line extending a considerable distance below the axis of said oscillating shaft.

HENRY G. W. YOUNG.